United States Patent [19]
Lattke

[11] 3,736,723
[45] June 5, 1973

[54] FILM WRAPPING MACHINE
[75] Inventor: Horst G. Lattke, Middletown, Conn.
[73] Assignee: Emhart Corporation, Bloomfield, Conn.
[22] Filed: May 19, 1971
[21] Appl. No.: 144,844

[52] U.S. Cl..................................53/180, 53/184
[51] Int. Cl. ............................B65b 51/30
[58] Field of Search.....................53/180, 182, 184

[56] References Cited
UNITED STATES PATENTS

| | | | |
|---|---|---|---|
| 3,295,290 | 11/1967 | Billingsley et al.............. | 53/182 X |
| 3,357,151 | 12/1967 | Monaghan...................... | 53/180 X |
| 3,481,107 | 12/1969 | Andblad et al. ................ | 53/182 X |

*Primary Examiner*—Travis S. McGehee
*Attorney*—McCormick, Paulding & Huber

[57] ABSTRACT

A film wrapping machine is disclosed for enveloping articles in a transparent, shrinkable film. The articles are translated serially onto a conveyor while a first film is fed between the articles and the conveyor and a second film is laid over the articles. A flight bar carrier folds or tucks the second film between the articles and presses the second film into contact with the first film. Heat is applied to the areas of contact between the two films so that the films become welded together in one or more seams as the articles and films are transported along the conveyor. A cutting mechanism severs the films between articles along or adjacent the welded seams. The separated articles enveloped by the films are then accelerated to a shrink tunnel which heats the films and causes them to shrink tightly against the article.

16 Claims, 6 Drawing Figures

Inventor
HORST G. LATTKE
Attorneys

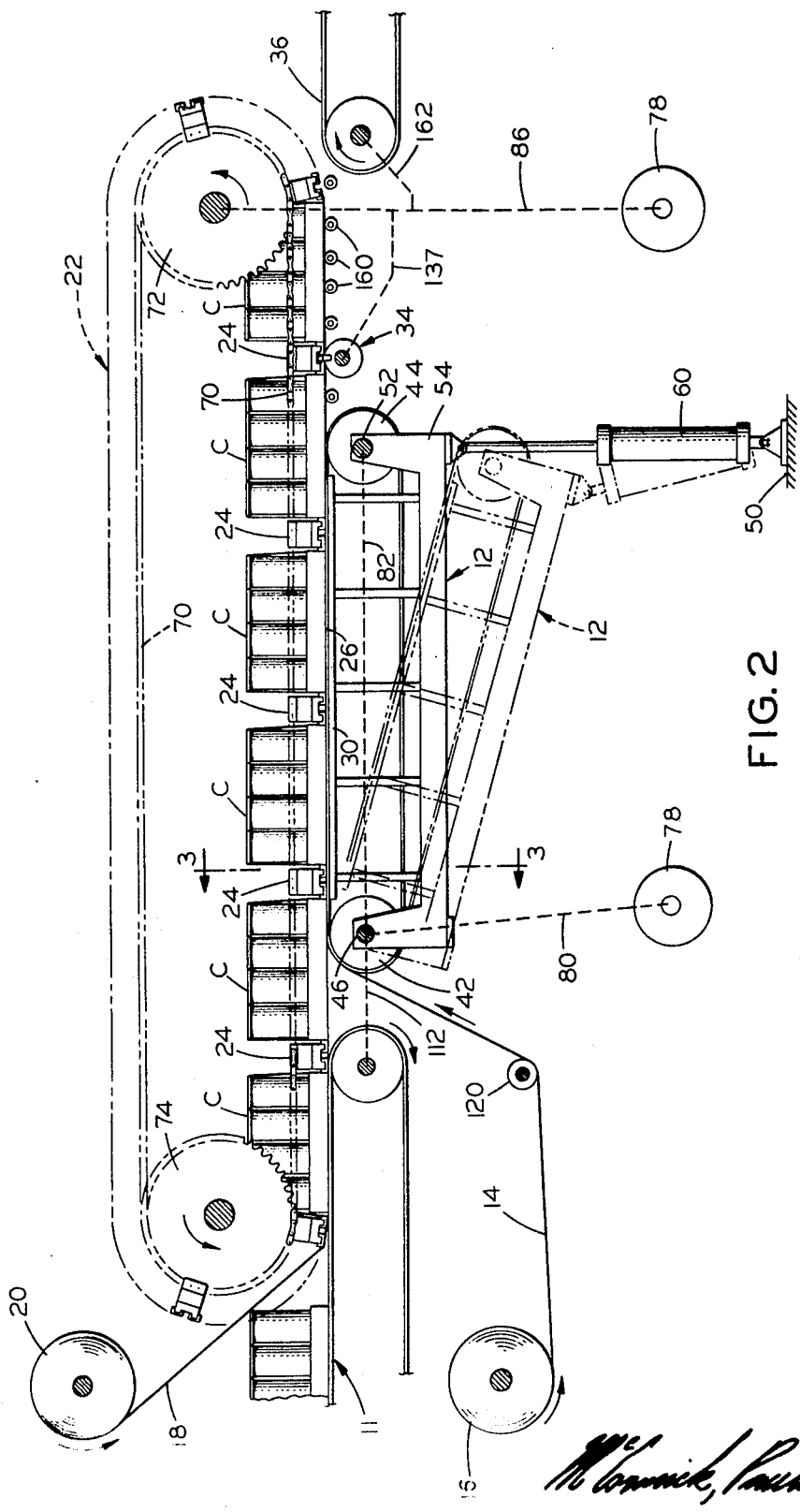

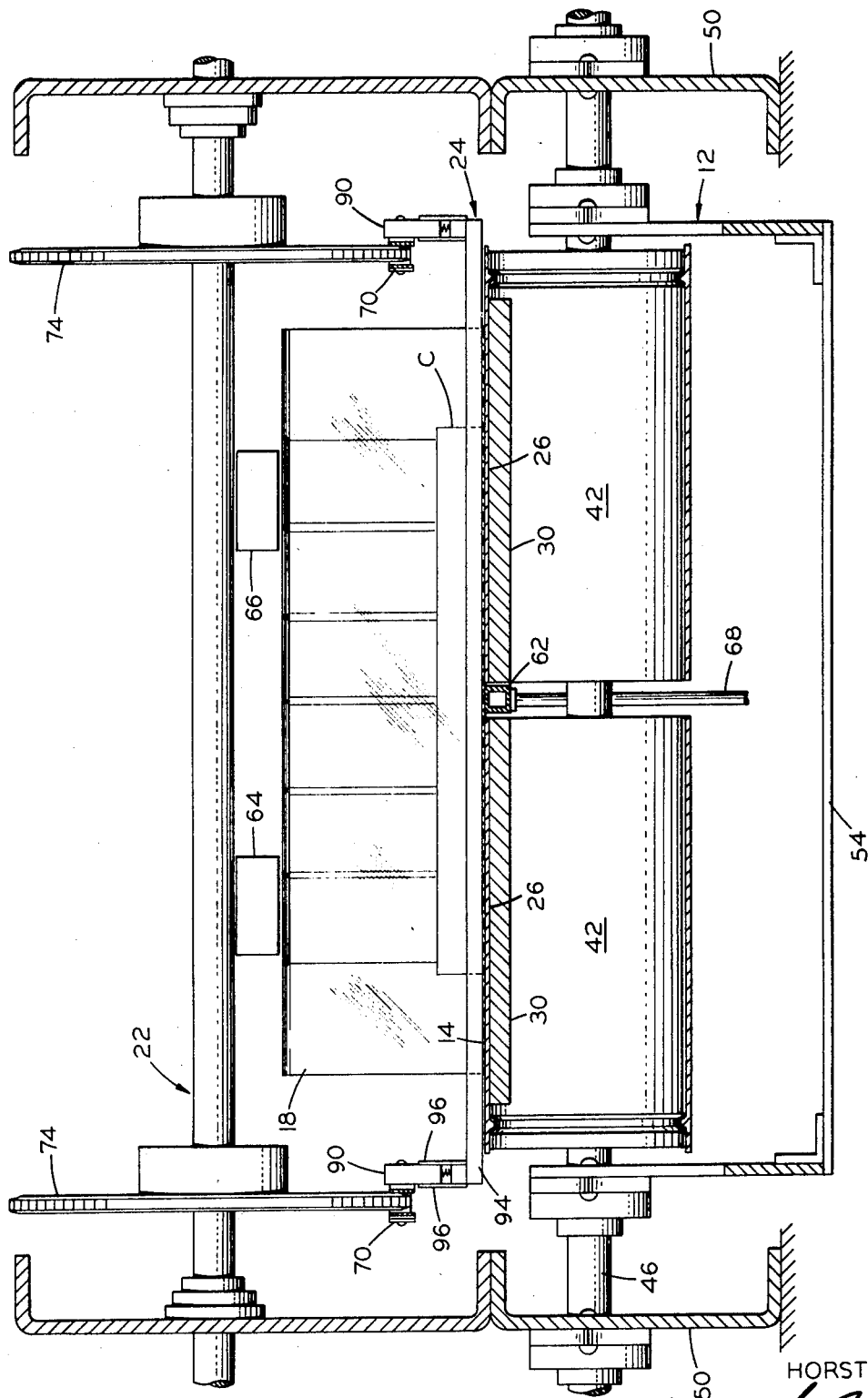

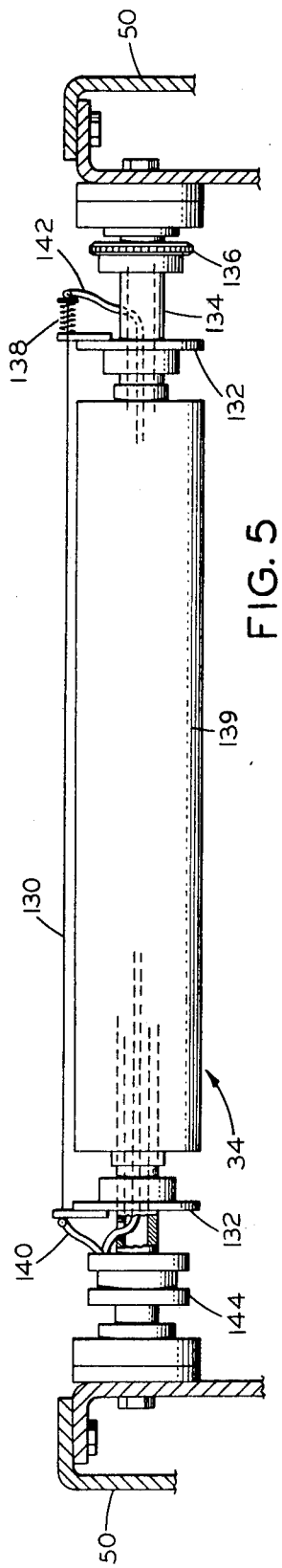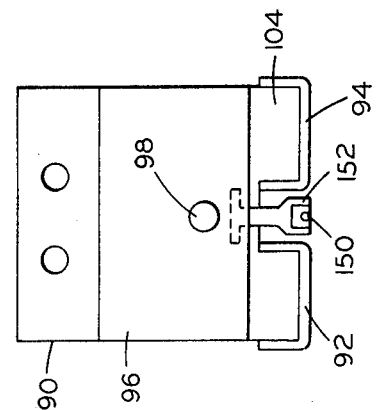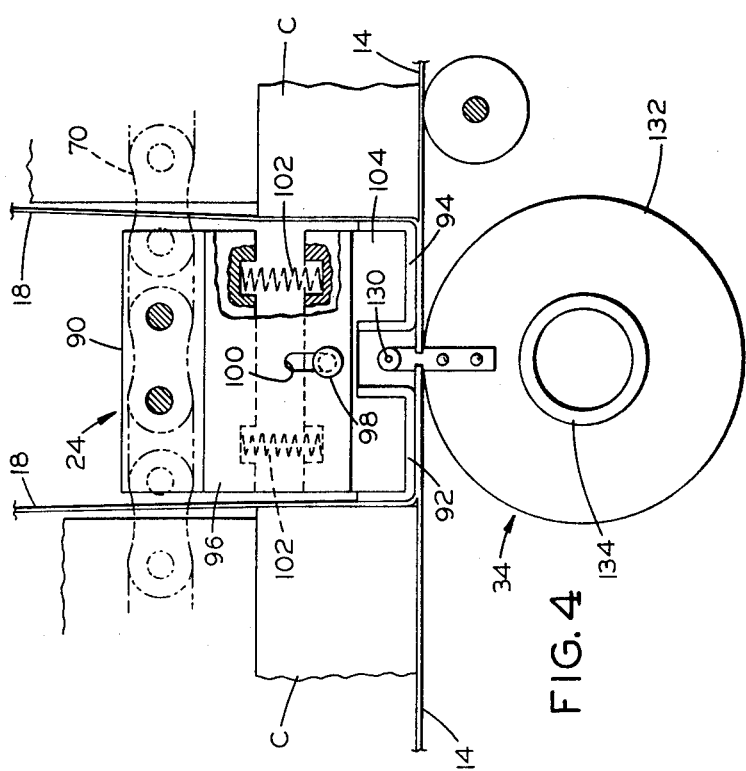

FILM WRAPPING MACHINE

BACKGROUND OF THE INVENTION

The present invention relates to a film wrapping machine and more particularly is directed to an improved shrink film wrapping machine which is specially suited for enveloping comparatively large packaged articles in a close-fitting, transparent wrapper.

It is common practice to package consumer products in transparent, shrinkable wrappings which permit the product itself or an attractive container to be viewed through the wrapping. In the past such packaging has been generally limited to articles of smaller size; however, such packaging methods are equally as desirable for larger items, such as cases of canned beverages and a multitude of other products which are sold to the consumer fully exposed or within an attractive container or package.

Several objects are served by enveloping articles in attractive wrappings. Firstly, the wrapping may be utilized to hold several pieces or containers together or to keep a package closed. Secondly, the wrapping may serve as a protective covering which keeps the underlying article clean and dry or at least reduces the amount of contamination to which the article would otherwise be exposed. Lastly, the wrapping may be utilized to improve the appearance of the product or to more clearly expose the product and thereby stimulate its acceptance in the market. Shrinkable film wrappers provide each of these factors and for this reason have gained wide acceptance in the packaging industry.

Accordingly, it is a general object of the present invention to disclose an improved wrapping machine for applying transparent, shrinkable films to packaged articles.

SUMMARY OF THE INVENTION

The present invention resides in a film wrapping machine of an improved type. The machine includes a conveying means, such as a conveyor belt, having a receiving end and a discharging end for serially transporting articles in spaced relationship from one end to the other. First film feeding means are positioned adjacent the receiving end of the conveying means for feeding a first continuous film of shrinkable wrapping material onto the conveying means between the articles and the conveying means. Second film feeding means are also positioned adjacent the receiving end of the conveying means for feeding a second continuous film of shrinkable wrapping material over the transported articles and the conveying means. Folding means, such as a flight bar carrier overlying the conveying means, are provided for folding or tucking the second film between the serially adjacent articles on the conveying means and for pressing the second film into contact with the first film between the articles. At the same time the folding means conforms the second film to the general shape of the article. Heating means are provided for sealing or welding the two films together at the contact points generated by the folding means between adjacent articles. The heating means may take various forms such as a resistance wire supported within the flight bar carrier or a heating plate positioned below the portion of the conveyor belt on which the transported articles are a supported. Cutting means are also provided for severing the films between adjacent articles before each article is transported through a shrink tunnel in which the films are heated and caused to shrink tightly against the article.

BRIEF DESCRIPTION OF THE DRAWINGS

FIG. 2 is a side elevation view of the flight bar carrier and the conveyor on which the articles are enveloped in the wrapping material.

FIG. 3 is a sectional view of the conveyor and flight bar carrier as seen along the sectioning line 3—3 of FIG. 2.

FIG. 4 is a detail view of a flight bar in registration with the film cutting wire.

FIG. 5 is an end view of the film cutting mechanism.

FIG. 6 is a detail view of an alternate flight bar in which a film cutting wire is supported.

DESCRIPTION OF THE PREFERRED EMBODIMENTS

Figure 1:
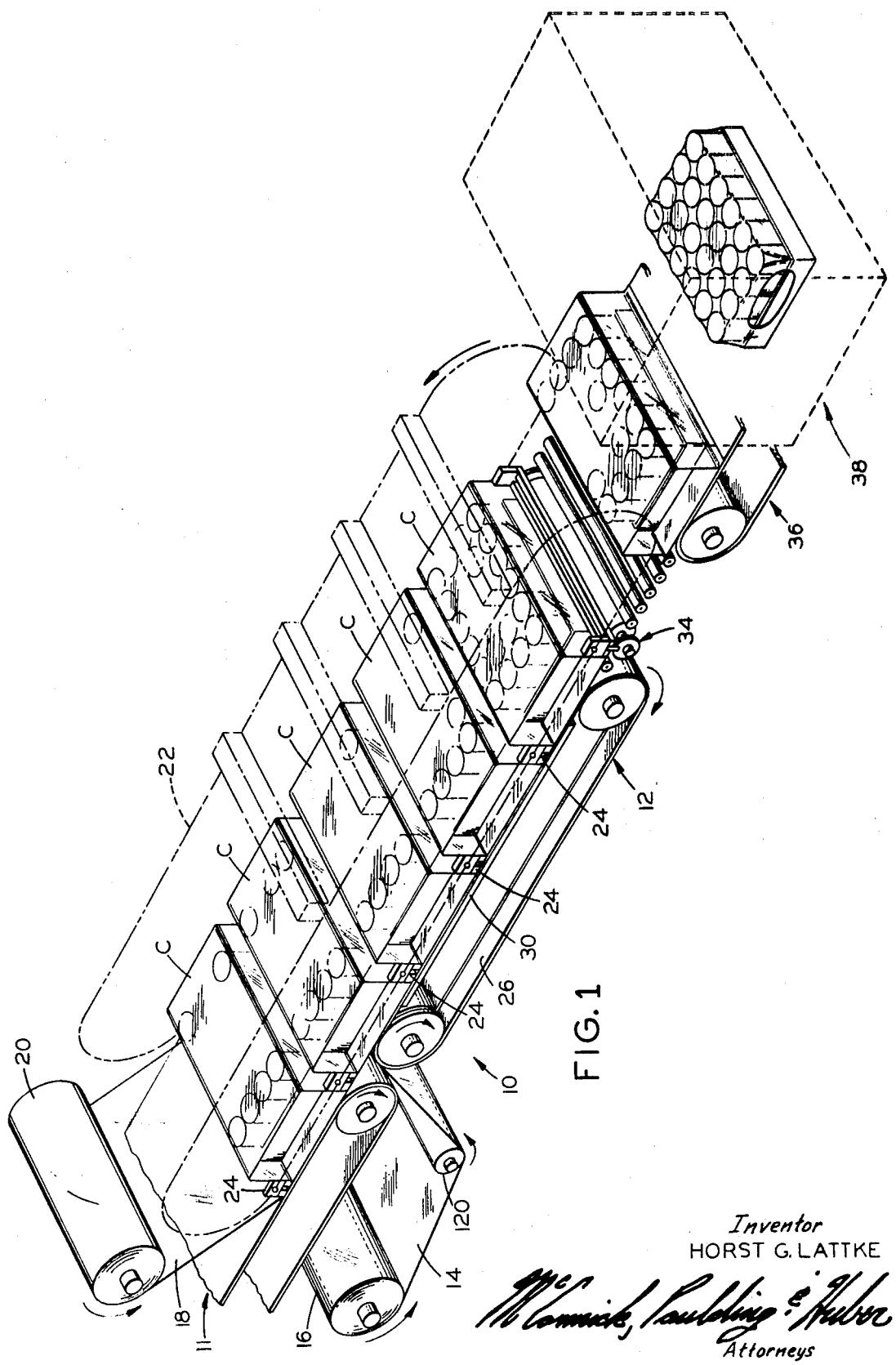
FIG. 1 is a perspective view of the improved shrink film wrapping machine and indicates schematically the general operations performed by the machine in wrapping articles.

FIG. 1 shows a shrink film wrapping machine, generally designated 10, embodying the present invention. The packaging machine is shown schematically to more clearly indicate the various components of the machine and the processes which are performed by each component on the articles to be wrapped.

Shrink film wrapping material is suitable for enveloping many different types of packages and, in this respect, the wrapping machine 10 can be employed with many different products. The machine 10 is particularly suitable for wrapping articles such as containers which have been previously packaged in paperboard trays. Accordingly, the specific articles shown in the drawings and utilized in describing the invention hereinafter consists of a case or tray which has been filled with cans of the type in which beverages are frequently distributed and sold to consumers.

The cases C enter the packaging machine 10 from the left as viewed in FIG. 1 and are translated serially through several different packaging stages to the right as indicated by the arrows. The cases C are initially deposited from an infeed conveyor 11 on the receiving or upstream end of a horizontal wrapping conveyor 12 to which a transparent, shrinkable film 14 is supplied. The film 14 is a continuous film fed to the conveyor 12 from a supply roll 16 which is preferably mounted on a feed spool adjacent the receiving end and below the upper side of the conveyor 12. Another transparent, shrinkable film 18 is supplied over the cases C from a second supply roll 20 mounted above the receiving end of the conveyor 12. A continuous motion flight bar carrier 22 composed of a plurality of flight bars 24 suspended between two endless chains is utilized to fold or tuck the second film 18 between each of the cases C and at the same time presses the second film downwardly between the packages into contact with the first film 14 on the conveyor 12. The flight bars 24 also insure that the cases continue to move over the conveyor 12 toward the discharging end of the conveyor as indicated by the arrows.

In one embodiment of the invention, the conveyor 12 includes an endless conveyor belt 26 which rides over a heating plate 30 positioned directly under the section of the belt on which the cases C are translated. The heating plate 30 transmits heat through the belt 26 to the bottom film 14. At the locations where the flight bars 24 press the film 18 into contact with the film 14, there is good thermal contact between the bottom film 14 and the heated belt 26 along the entire length of the conveyor 12, and the heat delivered to the film from the plate 30 through the belt causes the films to be sealed or welded together in a seam at the line of contact formed by the bar 24. As a result, the films are welded together at each longitudinal end face of the cases and each of the cases arrives at the discharging end of the conveyor 12 enveloped in a sleeve of shrinkable material formed by the films 14 and 18.

A hot-wire film cutting mechanism 34 is mounted adjacent to the discharging end of the conveyor 12 and cooperates with the flight bars 24 to sever the films 14 and 18 between each of the cases. The cases are then moved downstream onto an acceleration belt and are transferred into a shrink tunnel 38. The shrink tunnel 38 is conventional and comprises basically an oven which rapidly heats the sleeve of film surrounding the case and causes the sleeve to shrink down to a size tightly enveloping the case and thereby form a stretched skin or wrapping conforming to the shape of the case and the canned goods.

Having described briefly the operation of the shrink film wrapping machine, reference is now made to FIGS. 2 and 3 which show the detailed construction of the conveyor 12 and the flight bar carrier 22 which envelop the cases C in the films 14 and 18. The conveyor 12 is comprised of dual conveyor belts 26 which extend in side-by-side relationship from the receiving end of the conveyor to the discharging end. At the receiving end, the belts 26 are mounted on a corresponding pair of idler rollers 42 and, at the discharging end, the belts are mounted on a corresponding pair of drive rollers 44. The idler rollers 42 rotate freely on a shaft 46 which is secured to the frame 50 of the machine 10. At the discharging end of the conveyor, the drive rollers 44 are fixed to a drive shaft 52 which is supported at the end of a conveyor beam 54 pivotally connected to the shaft 46 at the receiving end of the conveyor.

The aluminum heating plate 30 is divided into two halves and each half is mounted to the conveyor beam 54 and located under one of the belts 26 so that heat is transmitted to the films 14 and 18 through the upper portions of the belts on which the cases C translate. In a preferred embodiment of the invention, the belts 26 are teflon-coated, glass fiber or equivalent which readily transmit heat from the plates 30 through the belts to the films for welding the films together between cases.

The conveyor beam 54 is pivotally mounted to the shaft 46 and effectively forms an adjustable drop table with the belts 26 so that the entire conveyor 12 can be dropped away from the cases C in the event that the conveyor 12 inadvertently stops. If the cases C were allowed to sit on the heated belt for an extended period of time, it is possible that the cases could be heated to a point that would damage the products within and also cause the films 14 and 18 to be damaged or to shrink prematurely. For this purpose, a pneumatic jack 60 is connected between the frame 50 and the discharging end of the conveyor 12 to adjust or lower the conveyor from the horizontal position away from the cases. A stationary horizontal supporting beam 62 extends longitudinally along the conveyor between the two belts 26 adjacent the upper portions of the belts and supports the cases temporarily with the aid of two additional overhead beams 64 and 66 extending longitudinally through the frame 50 above the respective belts. The cases remain in place between the three beams 62, 64 and 66 when the pneumatic jack 60 pivotally lowers the conveyor 12. The beam 62 is provided with a central conduit through which a cooling fluid is pumped from the hose 68 during the operation of the heating plates 30. As a consequence, when the conveyor 12 is lowered, the cases C rest against a cool surface and the films 14 and 18 are not damaged.

The flight bar carrier 22 is comprised of a pair of chains 70 located at opposite lateral sides of the conveyor 12 and the plurality of flight bars 24 connected between the chains 70 and extending generally transversely of the conveyor belts 26. A pair of drive sprockets 72 are suspended from the machine frame 50 at lateral positions downstream of the discharging end of conveyor 12 and a pair of idler sprockets 74 are mounted at lateral positions upstream of the receiving end. Adjacent flight bars 24 are spaced from one another by a distance equal to the width of the case C so that the bars fold or tuck the top film 18 tightly against the longitudinal end faces of the cases on the conveyor. If different size cases are employed, and the overall length of the carrier may be adjusted by adding links to the chains 70 between the bars so that the flight bars remain evenly spaced at each point along the chains. Also the overhead beams 64 and 66 may be adjusted vertically for cases of different heights.

The carrier 22 and the conveyor 12 are driven at a synchronous speed by means of a common drive motor 78 located below the conveyor 12 so that there is no slippage or relative movement between the films, the conveyor and the cases C. The conveyor belts 26, the drive rollers 44 and the drive shaft 52 are driven from the motor 78 by means of two chain-and-sprocket drive trains 80 and 82. The drive sprockets 72 of the carrier 22 are driven from the motor 78 by means of a chain-and-sprocket drive train 86 and, of course, the flight bars 24 are pulled along the conveyor belts 26 by means of the carrier chains 70.

The detailed construction of the flight bars 24 is shown in FIGS. 3 and 4. The bar 24 is composed of two attachment brackets 90 connected respectively to the two carrier chains 70 and two floating shoes 92 and 94 which extend in spaced, parallel relationship between the brackets 90. The shoes 92 and 94 are suspended from each of the brackets 90 by two pairs of slotted side plates 96 which are connected to the respective brackets 90 through pins 98 that project through vertically oriented slots 100 in the plates. The shoes are resiliently biased downwardly by springs 102 interposed between each of the brackets 90 and the block 104 holding the shoes 92 and 94. The compliance provided by the springs 102 between the carrier chains 70 and the shoes 92 and 94 allows the shoes to gently engage the upper film 18 as the bar sweeps downwardly at the receiving end of the conveyor 12 and causes the pressure between the films 14 and 18 at the welds or sealing points to be more uniform as the bars and cases translate longitudinally along the heated belts 26 from one end of the conveyor 12 to the other. The shoes may be teflon coated to allow the shoes to slip over the film 18 as they engage the film and to prevent adjesion to the film during the welding operation.

The infeed conveyor 11 shown in FIGS. 1 and 2 is mounted in alignment with the conveyor 12 adjacent the receiving end and delivers the cases C consecutively from a grouper or other package handling mechanism. The infeed conveyor is driven at a speed greater than that of conveyor 12 through the drive train 112 connected with the drive trains 80 and 82 at shaft 46. The higher speed of conveyor 11 insures that a case C is brought into engagement with one of the flight bars 24 in the vicinity of the discharging end of conveyor 11 as the following flight bar sweeps downwardly over the conveyor into position behind the case. The following flight bar 24 also pulls the top film 18 downwardly onto the incoming case and against the trailing end face.

The flight bars 24 move the cases between the infeed conveyor 11 and the conveyor 12. At the same time, the bottom film 14 is supplied between the conveyors 11 and 12 over the idler roller 120. Since the bottom film 14 is frictionally engaged with the conveyor belts 26, the cases C and the film 14 move onto the receiving end of the conveyor 12 at the same speed and, therefore, without slippage that might otherwise damage the film.

As the cases within the sleeves formed by films 14 and 18 leave the discharging end of the conveyor 12, the hot wire cutting mechanism 34 shown in FIGS. 1, 2, 4 and 5 severs the films between adjacent cases. The cutting mechanism 34 is composed primarily of a heated resistance wire 130 extending transversely to the conveyor belts 26 at the discharging end. The wire 130 is stretched by means of a spring 138 between two flanges 132 fixed to a hollow rotatable shaft 134. A sprocket 136 is fixed to the shaft 134 and driven by a driven train 137 (FIG. 2) with the drive train 86 of the sprockets 74 of the flight bar carrier 22. A roller 139 freely rotatable on the shaft 134 supports the cases as they move over the cutting mechanism 34. The rotation of the shaft 134 and consequently the wire 130 is synchronized or phased with the motion of the flight bars 24 so that the wire meshes or registers with the space between the shoes 92 and 94 on each flight bar 24 as seen in FIG. 4. The resistance wire 130 is connected at each end to electrical conductors 140 and 142 respectively, and the conductors are in turn connected through a commutator 144 to an electrical power source (not shown) so that the resistance wire can be heated to a temperature which allows the wire to easily cut through the films 14 and 18 as it rotates into the space between the parallel shoes 92 and 94 of the flight bars. It will be readily understood that each shoe 92 or 94 creates a line of contact and, correspondingly, a transverse welding seam between the films 14 and 18; therefore, the resistance wire 130 severs the films 14 and 18 between the two welded seams and the films remain bonded together at each side of the cut after adjacent cases are separated.

An alternate construction of the flight bars on the carrier 22 is shown in FIG. 6. In this embodiment of the invention, a resistance wire 150 is mounted within the space between shoes 92 and 94 of the flight bars by means of brackets 152. With such construction, the wire 150 cuts through the films 14 and 18 as the cases are translated over the conveyor 12 and, in the process, fuses or welds the cut edges of the films together. Accordingly, the wire performs both the welding and cutting functions. A separate cutting mechanism 34 is not required and the heating plates 30 may be eliminated.

Additional heating elements imbedded in the shoes 92 and 94 can be utilized to provide the broad weld seams under each shoe where the heating plates are not used.

To complete the wrapping operation, the individual cases enclosed within the sleeves formed by films 14 and 18 are discharged from the conveyor 12 over the cutting mechanism 34, if employed, and several conveyor rollers 160 onto the acceleration belt 36 shown in FIGS. 1 and 2. The acceleration belt is driven through a drive train 162 from drive train 86 at a higher speed than the belts 26 of conveyor 12 or the flight bars 24 and separates the packages for translation into the shrink tunnel 38 where the films are shrunk into close fitting contact with the cases. Since the sleeves formed by films 14 and 18 have openings at each end, an opening remains at each side of the cases as shown in FIG. 1 following the shrinking operation. With canned goods and other articles, the opening is not critical and since the film covers substantially all of the package, it provides an attractive, easily removed, transparent wrapping.

While the present invention has been described in several alternative embodiments, it will be readily understood that other modifications and substitutions can be had in the forms of the conveyor 12, the flight bars, the heating plates and other features without departing from the spirit of the invention. Accordingly, the present invention has been described in several different forms merely by way of illustration rather than limitation.

I claim:

1. In a film wrapping machine, the improvement comprising: first conveying means having a receiving end and a discharging end and including a conveyor belt extending between the ends for transporting articles in spaced relationship serially in a given direction from the receiving end to the discharging end; a first film supply means positioned adjacent the receiving end of the first conveying means for supplying a first continuous film of shrinkable wrapping material in the given direction onto the conveying means between the articles and the conveyor belt; second film supply means positioned adjacent the receiving end of the first conveying means for supplying a second continuous film of shrinkable wrapping material in the given direction over the transported articles and the conveying means; folding means overlying at least one portion of the conveyor belt of the conveying means for tucking the second film between serially adjacent articles on the conveying means and pressing the second film into contact with first film on the conveyor belt; and heating means comprising a heating plate located in close proximity to the one portion of the conveyor belt over which the folding means lies for welding the first and second films together at the contact points generated by the folding means between serially adjacent articles.

2. In a film wrapping machine, the improvement of claim 1 wherein the folding means comprises a flight bar carrier having a plurality of flight bars oriented transversely of the conveyor belt.

3. In a film wrapping machine, the improvement as defined in claim 2 wherein the flight bar carrier includes a pair of endless carrier chains and each of the plurality of flight bars includes a floating shoe extending between the carrier chains.

4. In a film wrapping machine, the improvement defined in claim 2 further including common drive means connected to the first conveying means and the flight bar carrier for driving the flight bars and the articles at the same speed.

5. The improvement of claim 1 wherein cutting means is provided adjacent to the discharging end of the first conveying means for severing the first and second films between serially adjacent packages.

6. In a film wrapping machine, the improvement of claim 1 further including second conveying means positioned adjacent the receiving end of the first conveying means for delivering articles to the first conveying means between the first and second films.

7. A shrink film wrapping machine comprising: an article conveyor having an article receiving end and an article discharging end and including an endless belt on which articles are carried between the receiving and discharging ends; a flight bar carrier extending parallel to the conveyor in closed proximity to the endless belt and having a series of flight bars extending transversely of the belt and suspended between a pair of endless chains; drive means connected to the conveyor and the carrier for driving the endless belt and the flight bars adjacent the belt in the same direction at the same speed; article feeding means for delivering articles serially onto the endless belt at the receiving end of the conveyor; first film feeding means for feeding a first shrinkable film between the articles and the belt at the receiving end of the conveyor; second film feeding means for feeding a second shrinkable film between the articles and the flight bars at the receiving end of the conveyor; and means for joining the first and second films together in a seam between the articles on the conveyor.

8. The shrink film wrapping machine of claim 7 wherein the endless belt comprises a glass fiber belt and the means for joining comprises a heating plate mounted between the ends of the conveyor and within the endless belt on which the articles are carried.

9. The shrink film wrapping machine of claim 7 wherein the article conveyor is a horizontal conveyor comprised of an adjustable conveyor beam supporting the endless belt under the flight bar carrier and a stationary horizontal support beam extending laterally adjacent the endless belt and under the flight bar carrier parallel to the carrier, the adjustable beam being adjustable to drop the endless belt away from the flight bar carrier and below the horizontal support beam.

10. The shrink film wrapping machine of claim 9 wherein the article conveyor includes a pair of endless belts located respectively at opposite sides of the stationary horizontal support beam, and the support beam includes a cooling fluid conduit.

11. The shrink film wrapping machine of claim 9 wherein the means for joining comprises a heating plate mounted to the adjustable conveyor beam and located closely adjacent to the segment of the endless belt on which the articles rest between the receiving and discharging ends of the article conveyor.

12. A shrink film wrapping machine as defined in claim 7 further including means for separating adjacent articles enveloped by the first and second films at the seam formed by the means for joining the films.

13. A shrink film wrapping machine as defined in claim 12 wherein the means for joining and the means for separating comprise heating elements mounted in the flight bars.

14. A shrink film wrapping machine as defined in claim 7 wherein each of the flight bars comprises a pair of film engaging shoes extending in parallel relationship between the endless chains; and means are provided for severing the first and second films between the pair of shoes.

15. A shrink film wrapping machine as defined in claim 14 wherein the means for severing comprises a resistance wire stretched parallel to the flight bars and means for rotating the wire about an axis parallel to the flight bars to bring the resistance wire in mesh with the parallel shoes of each flight bar.

16. A shrink film wrapping machine as defined in claim 7 further including a shrink tunnel positioned downstream in the direction of article movement from the discharging end of the article conveyor and means for transferring the articles from the discharging end of the conveyor into the shrink tunnel.

* * * * *